(12) United States Patent
Doyle

(10) Patent No.: US 9,107,784 B2
(45) Date of Patent: Aug. 18, 2015

(54) BEDRAIL CLAMP

(75) Inventor: Mark Doyle, Del Mar, CA (US)

(73) Assignee: CAREFUSION 2200, INC., San Diego, CA (US)

(*) Notice: Subject to any disclaimer, the term of this patent is extended or adjusted under 35 U.S.C. 154(b) by 758 days.

(21) Appl. No.: 12/792,577

(22) Filed: Jun. 2, 2010

(65) Prior Publication Data

US 2010/0299890 A1 Dec. 2, 2010

Related U.S. Application Data

(63) Continuation-in-part of application No. 12/558,843, filed on Sep. 14, 2009.

(60) Provisional application No. 61/096,402, filed on Sep. 12, 2008.

(51) Int. Cl.
| | | |
|---|---|---|
| *B23Q 3/02* | (2006.01) | |
| *A61G 7/05* | (2006.01) | |
| *F16B 2/18* | (2006.01) | |
| *A61G 13/10* | (2006.01) | |

(52) U.S. Cl.
CPC . *A61G 7/05* (2013.01); *F16B 2/185* (2013.01); *A61G 13/101* (2013.01); *A61G 2203/80* (2013.01); *Y10T 24/44017* (2015.01); *Y10T 29/49959* (2015.01)

(58) Field of Classification Search
USPC ......... 269/43, 6, 3, 246, 254 CS, 95, 97, 143, 269/249, 45, 228, 24, 32, 27
See application file for complete search history.

(56) References Cited

U.S. PATENT DOCUMENTS

| | | | | |
|---|---|---|---|---|
| 232,892 | A * | 10/1880 | Hickcox | 269/254 CS |
| 2,682,694 | A * | 7/1954 | Kempkes | 24/569 |
| 3,745,638 | A * | 7/1973 | Minera | 29/271 |
| 3,837,633 | A * | 9/1974 | Paulsen | 269/128 |
| 3,842,696 | A * | 10/1974 | Wayne | 81/424.5 |
| 4,487,523 | A | 12/1984 | Monroe | |
| 4,524,475 | A * | 6/1985 | Valentino | 5/507.1 |
| 4,563,921 | A * | 1/1986 | Wallace | 81/373 |
| 5,433,222 | A | 7/1995 | Boomgaarden et al. | |
| 5,692,734 | A * | 12/1997 | Aldredge, Sr. | 269/166 |

(Continued)

FOREIGN PATENT DOCUMENTS

WO WO 2010/030981 A1 3/2010

OTHER PUBLICATIONS

International Preliminary Report on Patentability issued Dec. 4, 2012, in counterpart International Application No. PCT/US2011/038268.

(Continued)

*Primary Examiner* — Lee D Wilson
*Assistant Examiner* — Nirvana Deonauth
(74) *Attorney, Agent, or Firm* — Arent Fox LLP

(57) ABSTRACT

A quick lock and release clamp mountable onto the bedrail of an operating table, hospital bed, and the like. The clamp includes a body, a foot, and a mouth having at least three sides defined by the body and foot. A biasing member is coupled to at least one of the body and the foot, wherein an actuating member coupled to the biasing member is configured to transmit a force to the mouth via the biasing member. A protrusion extending from the body and towards the foot engages the bedrail, thereby fixing the clamp onto the bedrail, by moving the actuating member in a first direction.

17 Claims, 18 Drawing Sheets

(56) References Cited

U.S. PATENT DOCUMENTS

| | | | |
|---|---|---|---|
| 6,467,380 B1* | 10/2002 | Azkona | 81/413 |
| 6,622,980 B2* | 9/2003 | Boucher et al. | 248/231.51 |
| 7,530,556 B1* | 5/2009 | Zheng | 269/6 |
| 7,566,038 B2* | 7/2009 | Scott et al. | 248/231.61 |
| 7,673,784 B2* | 3/2010 | Headings et al. | 228/44.3 |
| 2002/0170114 A1 | 11/2002 | Wolcott | |
| 2008/0098861 A1* | 5/2008 | Engvall et al. | 81/368 |
| 2008/0224375 A1* | 9/2008 | Mills et al. | 269/134 |
| 2010/0108841 A1* | 5/2010 | Kronner et al. | 248/229.13 |
| 2010/0109223 A1* | 5/2010 | Mills et al. | 269/207 |
| 2010/0117281 A1 | 5/2010 | Doyle | |
| 2010/0133400 A1* | 6/2010 | Scott et al. | 248/231.61 |

OTHER PUBLICATIONS

International Search Report issued Feb. 9, 2012, in counterpart International Application No. PCT/US2011/038268 (3 pages).
International Search Report issued Oct. 22, 2009, in counterpart International Application No. PCT/US2009/056818 (2 pages).
Chinese Office Action (with English summary) dated May 15, 2014 issued in Chinese Patent Application No. 201180026483.7.

* cited by examiner

BEDRAIL CLAMP

RELATED APPLICATIONS

This application is a continuation-in-part of pending U.S. application Ser. No. 12/558,843 filed Sep. 14, 2009 entitled "Bedrail Clamp," which is based upon and claims the benefit of priority from the prior U.S. Provisional Application No. 61/096,402 filed on Sep. 12, 2008, titled QUICK RELEASE CLAMP, the entire contents of which are incorporated herein by reference.

BACKGROUND OF THE INVENTION

1. Field of the Invention

The present invention relates to quick release clamps for use on rails, such as hospital bed rails.

2. Description of the Related Art

Rails, such as those found on hospital beds, are a convenient location for mounting hospital accessories or medical instruments. Many types of clamping devices have been devised for attachment on to such rails for securely holding the hospital accessories and/or medical instruments. The clamp devices can be as simple as a conventional "C" shaped clamp with jaws that pivot about the rail, or more complex screw rail clamps with articulating arms for more precise placement and positioning. The clamps are typically capable of receiving various sized instruments and securely attaching the instruments onto hospital bed rails of varying sizes and heights.

However, many known rail clamps are not designed to be clamped quickly or are too cumbersome for fast clamping. Clamps typically require several motions and adjustments before being able to secure an instrument to a rail, as hospital rails vary in height and shape from one bed to another. For instance, some rails may be round while others may be rectangular in cross-section. Therefore, varying heights and widths make it difficult to use known clamps to accommodate various types of rails. Instead, such clamps will typically require one or more adjustment steps to accommodate the specific rail to which the clamp is attached before being locked into place.

Thus, there is a need in the art for improved bedrail clamping devices and systems that allow rapid installation while accommodating variations in the rail characteristics.

SUMMARY OF THE INVENTION

Aspects of the present invention are particularly suited for use on rails, such as those found in various medical care settings. In such settings, there can be a mix of rails of varying characteristics, such as different heights and widths. Aspects of the present invention may be used on any suitable rail, bar, beam, or other support on which it is desirable to attach a clamp with minimal motion and effort. For example, such rails include those provided below a surgical table or hospital bed, among others.

In one aspect of the present invention, a clamping device for use on bedrails may include a body having a recess configured to be detachably mounted onto a rail, a jaw having a base portion with a protrusion extending therefrom, a biasing member, such as a spring, having a first portion and a second portion, wherein the first portion of the biasing member is mechanically coupled to the jaw, and an actuating member, wherein the actuating member may be movably coupled to the body, mechanically coupled to the second portion of the spring, and is configured to transmit a force to the jaw through the biasing member element.

In one variation of the present invention, a clamping device for use on bedrails may include a body having a base portion with a protrusion on the base portion, the body configured to be detachably mounted onto a rail, a jaw having a base portion with a protrusion extending therefrom, the jaw configured to engage the rail, a mouth formed by a gap between the body and the jaw, a spring, wherein the biasing member is mechanically coupled to the jaw, and an actuating member, wherein the actuating member may be movably coupled to the body and mechanically coupled to the biasing member, and is configured such that pivoting the actuating member causes the mouth to close by an amount sufficient to clamp the device to the rail.

One aspect of the present invention includes a clamping device for use on bedrails may include a body having a recess configured to be detachably mounted onto a rail, a jaw having a base portion and a spring, with a protrusion extending therefrom, and an actuating member, wherein the actuating member may be movably coupled to the body, mechanically coupled to the spring, and is configured such that pivoting the actuating member in a first direction causes the jaw and the body to clamp onto the rail.

Aspects of the present invention provide benefits and advantages that include the ability to rapidly install the clamp onto a rail allowing for an increase in efficiency when attaching the clamp to the rail. In addition, the present invention allows for one hand installation. Moreover, the present invention provides automatic adjustments for the clamp to fit on the various sizes and shapes of rails without the user having to tighten or adjust the clamp in order to lock the clamp on the rail.

Additional advantages and novel features relating to the present invention will be set forth in part in the description that follows, and in part will become more apparent to those skilled in the art upon examination of the following or upon learning by practice of aspects of the invention.

BRIEF DESCRIPTION OF THE DRAWINGS

The present invention will become fully understood from the detailed description given herein below and the accompanying drawings, which are given by way of illustration and example only and thus not limited with respect to aspects of the present invention, wherein.

DETAILED DESCRIPTION OF ASPECTS OF THE PRESENT INVENTION

Aspects of the present invention now will be described more fully hereinafter with reference to the accompanying drawings, in which variations and aspects of the present invention are shown. Aspects of the present invention may, however, be realized in many different forms and should not be construed as limited to the variations set forth herein; rather, these variations are provided so that this disclosure will be thorough and complete in the illustrative implementations, and will fully convey the scope thereof to those skilled in the art.

Unless otherwise defined, all technical and scientific terms used herein have the same meaning as commonly understood by one of ordinary skill in the art to which aspects of the present invention belong. The methods and examples provided herein are illustrative only and not intended to be limiting.

Figure 1:
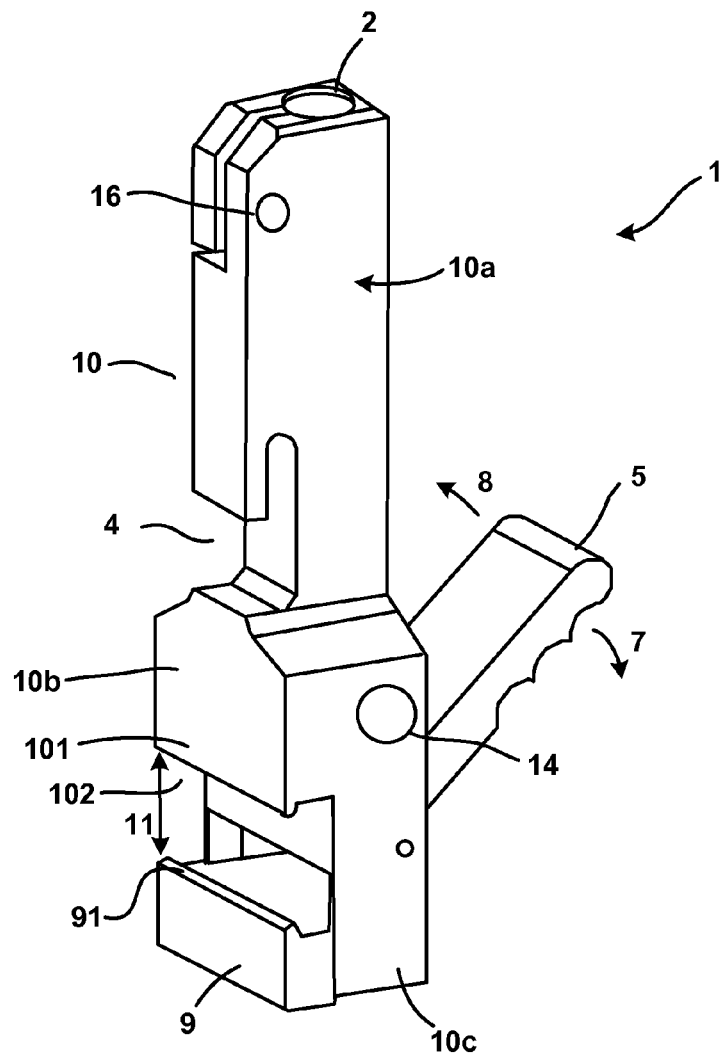
FIG. 1 is a perspective view of a clamp according to certain aspects of the present invention wherein the clamp is in an open position.

FIG. 1 shows a quick release bedrail clamp 1 that has been adapted for use on a bedrail of an operating table or bed, in accordance with an aspect of the present invention. The bedrail clamp 1 may allow for quick installation and release with the use of a single motion. According to an aspect of the present invention shown in FIG. 1, there is no need for clearance space to position and tighten screws or other such features, either above or below the bedrail. The bedrail clamp 1 in FIG. 1 includes of a body 10, a foot 9, an actuating member 5, and an accessory attachment section 4 that has been configured to allow the attachment of hospital accessories thereto. It should be appreciated that the actuating member 5 may be a lever, a handle, an arm, or actuated by any other suitable mechanism and in a similar suitable manner to raise and lift the foot 9 relative to the body 10. The body 10 may have three parts, an upper body portion 10a, a main body portion 10b, and a lower body portion 10c. The upper body portion 10a may include passages 16 and a post hole 2 for the insertion of posts, rods or bolts therein. Further, the upper body portion 10a may include an accessory attachment section 4 defined therein that has been configured to allow the attachment of hospital accessories thereto, such as, for example, instrument trays, surgical devices, IV bags, retractors, and arm and leg boards. The main body portion 10b may include a passage 14 defined therein for the insertion of posts, rods or bolts therein, and an upper jaw 101. The lower body portion 10c may include a foot 9 and a lower jaw 91.

A mouth 11 is defined between the body 10 and the foot 9, wherein the mouth 11 is capable of receiving a bedrail 12 or other features of the bed or table (not shown) to which the clamp 1 can be attached. The mouth 5 may be defined by an extension of a recess 102 defined by the main and lower body portions 10b and 10c, and an extension of the foot 9. It should be appreciated that while the mouth 5 is illustrated as having a "C" shaped cross-section, it is within the scope of the invention for the mouth 5 to have a cross-section of any suitable shape. Moreover, the lower jaw 91 extends away from the foot 9 toward the upper jaw 101, which extends into the recess 102, in order to better secure the rail 12 by partially surrounding the rail 12 when the clamp 1 is mounted onto the rail 12. The lower jaw 91 may be made of any suitable rigid material, such as metal, for example, which may bite into the rail 12 when compressed against the rail 12. The foot 9 may slidably move relative to the body 10. The body 10 may include the upper jaw 101 that extends downward into the recess 102, as discussed above, to better attach and secure the rail 12 when the clamp 1 is mounted therein. The upper jaw 101, like lower jaw 91, may be made of a suitable rigid material, such as metal among others.

It should be appreciated that lower and upper jaws 91 and 101 may be made of the same or different materials. Moreover, lower and upper jaws 91 and 101 may have an abrasive material, an adhesive material, or any other suitable material that is also able to prevent the jaws 91 and 101 from slipping or sliding off along the rail 12 so as to fixedly secure the lower and upper jaws 91 and 101 on the rail 12. Further, the lower and upper jaws 91 and 101 may be made of any material that may provide a suitable degree of compressibility when clamp 1 is secured onto rail 12. For example, lower and upper jaws 91 and 101 may be made of rubber, polyurethane, or any other non-slip material, or even have a coating of such material provided on the outermost surface thereof that contacts and engages the rail 12.

In addition, the body 10 may include several features to facilitate attachment to various medical instruments. Medical instruments may include, among others, instrument trays, surgical devices, IV bags, retractors, arm and leg boards, and the like. Furthermore, passage 14 may be provided for instrument attachment. It should be appreciated other similar features that may be used to facilitate medical instrument attachment may also be used with the clamp 1.

Figure 2:
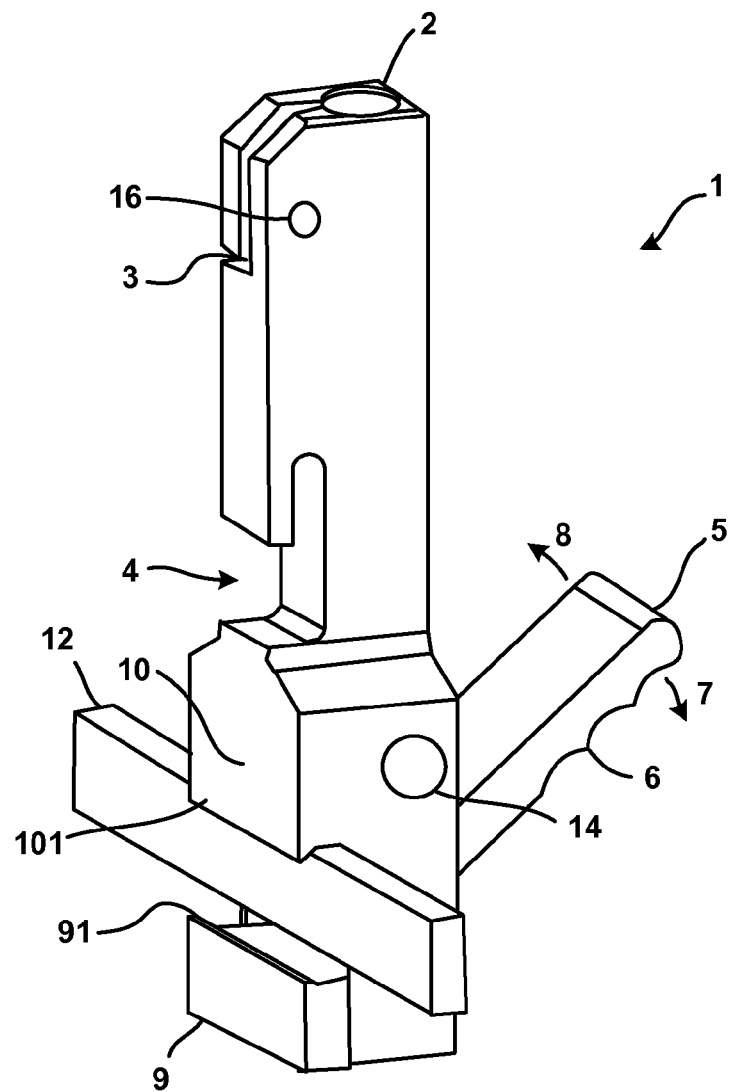
FIG. 2 is a depiction of the clamp in FIG. 1 wherein the clamp is being installed on a rail.

FIG. 2 illustrates the clamp 1, as shown in FIG. 1, where the clamp 1 is in the process of being installed onto the bedrail 12. The clamp 1 is oriented such that the mouth 11 engages at least two, preferably three, and even four sides of the bedrail 12, such that the bedrail 12 is located in the recess 102 defined by the body 10 when the clamp 1 is mounted onto the bedrail 12. The clamp 1 may engage the bedrail 12, such that the clamp 1 is supported by the bedrail 12 without falling off, even though the clamp 1 has not yet been secured thereto. In the depicted exemplary orientation, the main body portion of 10b rests on the top surface of the bedrail 12. The upper jaw 101 extends over the top edge of the bedrail 12 and projects toward the foot 9, thus keeping the clamp 1 from sliding or falling off the bedrail 12. Thus, the upper jaw 101 allows the clamp 1 to be easily hooked onto the bedrail 12 and held in place to facilitate the one-handed operation of the actuating member 5. At the above-described stage of attaching the clamp 1 to the bedrail 12, the actuating member 5 is in an open or unlocked position and the foot 9 is not fixedly engaged to the bedrail 12.

Figure 4A:
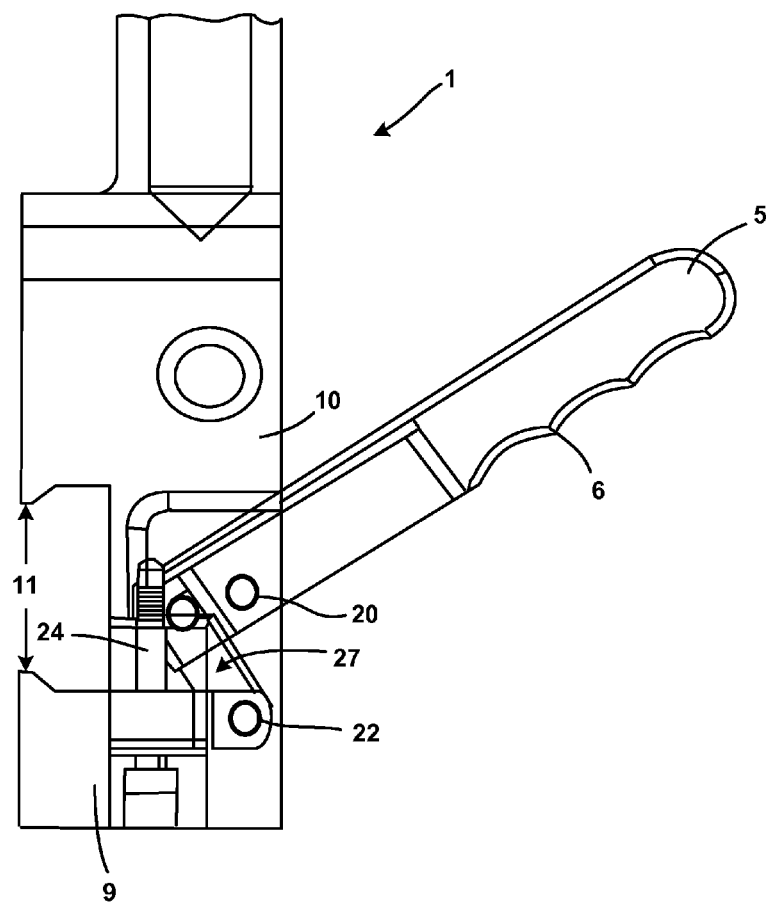
FIG. 4A is a cross-sectional side view of the clamp in FIG. 1 in an open position.

The actuating member 5 is capable of pivotal movement in the direction indicated by arrow 7. The actuating member 5 may be movably coupled to the body 10 by a joint or a pivot, among others, and is configured to transmit a force to the foot 9 through a biasing member 27 (as shown in FIG. 4A). Movement of the actuating member 5 downward in the direction 7 causes the foot 9 to move up and engage the bedrail 12. It should be appreciated that the orientation of the body 10 above the rail 12 and the foot 9 below the rail 12, as described above, may be switched to where the foot 9 is above the rail 12 and the body 10 is below the rail 12. The actuating member 5 may be movable orthogonal relative to bedrail 12 or parallel relative thereto. When the actuating member is moved orthogonal relative to bedrail 12, the actuating member 5 is pivotable but can also slide, or move in any other suitable manner, so as to lock and unlock clamp 1. When the actuating member is moved in parallel relative to bedrail 12, it is envisioned that actuating member 5 is rotated so as to lock and unlock clamp 1 by actuating about a center point.

Figure 3:
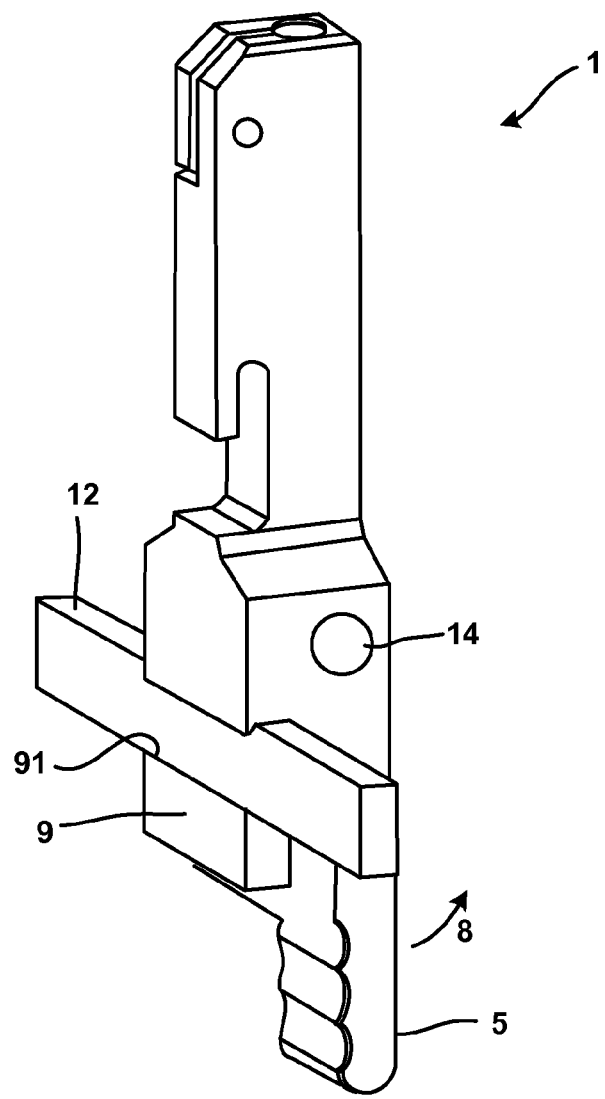
FIG. 3 is a depiction of the clamp in FIG. 2 wherein the clamp is in a locked position on the rail.

FIG. 3 is a depiction of the clamp 1 in FIGS. 1-2 with the actuating member 5 now in a closed or locked position. Tension in the biasing member forces the foot 9 to engage the bottom of the bedrail 12. The use of a biasing member further allows accommodation of various bedrail 12 dimensions. Movement of the actuating member 5 upward in the direction indicated by arrow 8 will unlock the clamp 1. In FIG. 3, the foot 9 is in a locked position and fixedly pressed against bedrail 12. Lower jaw 91 partially surrounds the rail and securely engages or bites into the rail 12 upon locking the clamp 1. This may enable the clamp 1 to securely or fixedly engage the bedrail 12 so that a hospital accessory may be placed in passages 14 and 16, post hole 2, and the accessory attachment section 4.

FIG. 4A is a cross-sectional side view of the clamp 1 depicted in FIGS. 1-3. As shown in FIG. 4A, the actuating member 5 is in an open or unlocked position, and may have a handle 6 with an elongated body which extends into the body 10 of the clamp 1. The actuating member 5 may be movably connected to the body 10 by a pivot or joint 20, about which the actuating member 5 pivotally moves. The actuating member 5 may also be rotatably connected to a biasing member 27 that is rotatably connected to the foot 9 by joint 22. The biasing member 27 may be a spring, a coil, an elastic member, flexible beam, a gas charged spring, hydraulic, or any other mechanism that conveys or transmits force so as to lock the clamp 1 into place. Also shown in FIG. 4A is a guiding shaft rod 24 that is operationally connected to the body 10 and which guides the sliding movement of the foot 9 as the actuating member 5 is moved between the locked and unlocked positions. The guiding shaft rod 24 has a lower cap 23 (see FIG. 4B) which prevents the foot 9 from sliding off of the shaft rod 24 and defines the extent of maximum opening of the mouth 11 defined by the upper and lower jaws 101 and 91 of the foot 9 and the body 10, respectively.

Figure 4B:
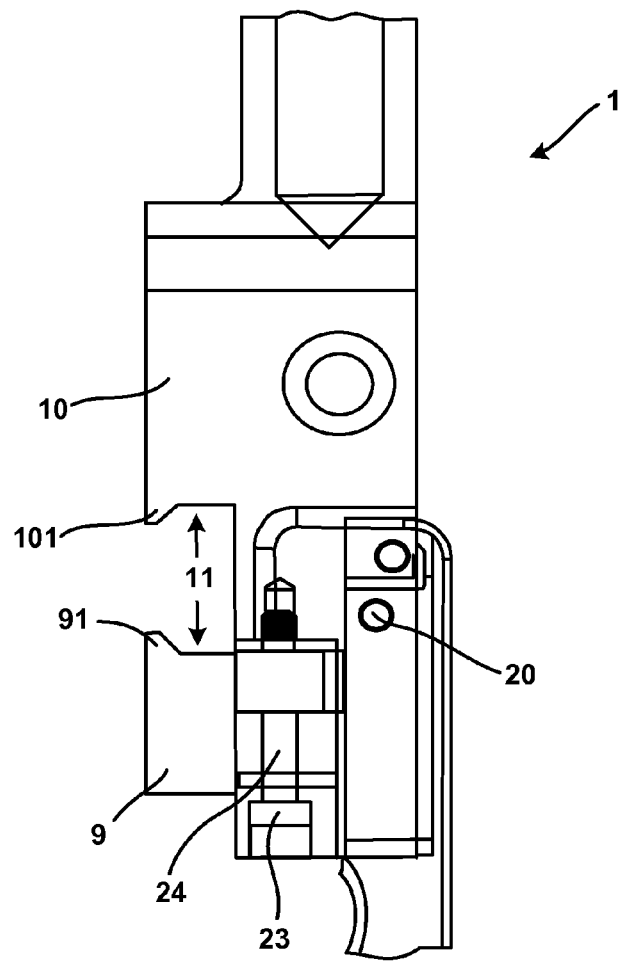
FIG. 4B is a cross-sectional side view of the clamp in FIG. 1 in a closed position.

FIG. 4B is a cross-sectional side view of the clamp 1 with the actuating member 5 in the locked position (i.e., with the clamp 1 in a closed position). When in the closed position, tension in the biasing member 27 forces the foot 9 upward along the shaft rod 24. The biasing member 27 provides for varying the extension or degree of which the mouth 11 is open and closed such that the clamp 1 may be used on bedrails 12 having differing heights. This is possible as the biasing member 27 permits automatic adjustment of the mouth 11 to accommodate for the height of various operating room bedrails. In addition, the lower and upper jaws 91 and 101 in the foot 9 and body 10, respectively, permit the clamp 1 to be used on a variety of bedrail shapes and widths. For example, bedrails having rectangular or circular cross-sections may be used. The lower and upper jaws 91 and 101 wrap partially around the backside of the bedrails 12 and may bite into the bedrails 12 to secure or fix the clamp 1 to the bedrail 12, preventing the clamp 1 from sliding off.

Although the biasing member 27 has been depicted as being directly connected to the actuating member 5 and the foot 9, it will be appreciate that any suitable coupling mechanism that allows the force from the actuating member 5 to be transmitted to the biasing member 27 and then transmitted from the biasing member 27 to the foot 9 may be used and is within the scope of this invention.

Figure 4C:
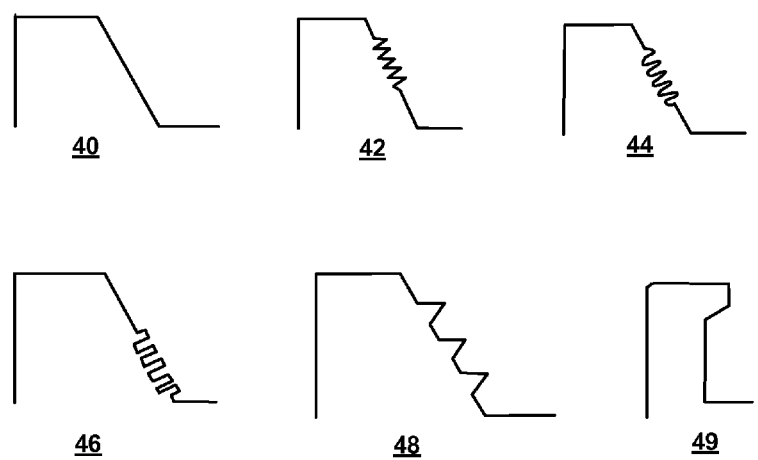
FIG. 4C is a depiction of various profiles of the upper and lower jaws of the clamp according to an aspect of the present invention.

FIG. 4C illustrates various profiles, for example, that lower and upper jaws 91 and 101 may have according to aspects of the present invention. That is, it is within the scope of the invention for the lower and upper jaws 91 and 101 to have a flat profile 40, a jagged profile 42, a sinusoidal curve profile 44, a rectangular wave profile 46, or a tooth profile 48. As is clear from the above discussion, it should be appreciated that lower and upper jaws 91 and 101 may have any number of suitable profiles that are either different or the same to each other. Moreover, as discussed above, the profile of the lower and upper jaws 91 and 101 may bite into the rail 12 to secure or fix the claim 1 into the rail 12.

Figure 5:
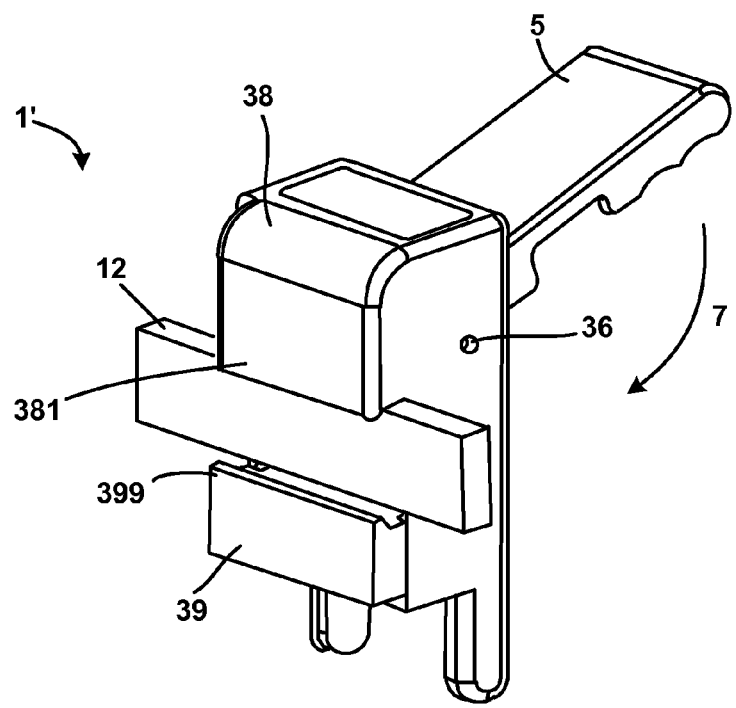
FIG. 5 is a perspective view of a clamp according to other aspects of the present invention in an open position.
Figure 6:
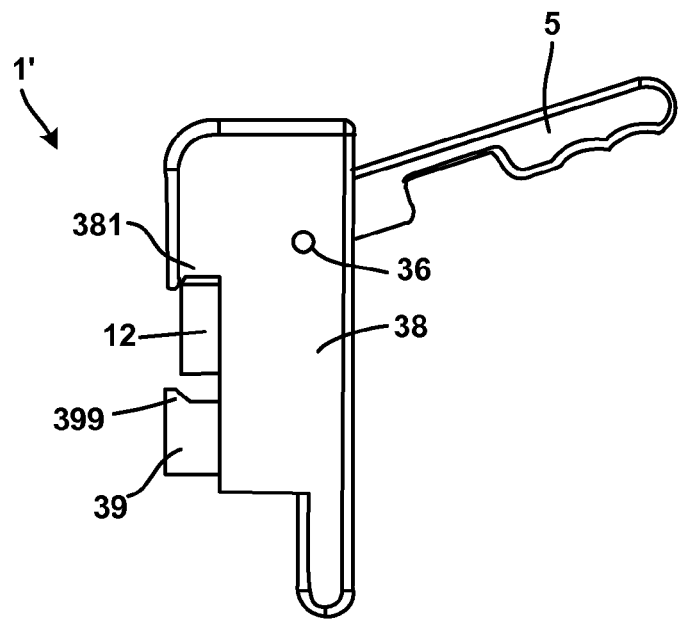
FIG. 6 is a side view of the clamp in FIG. 5.

FIG. 5-9 show another aspect of the present invention. The clamp 1' comprises a body 38, a foot 39, an actuating member 5, an upper jaw 381 on the body 38, and a lower jaw 399 located on the foot 39. The actuating member 5 may be movably coupled to the body 38 through use of bolts in bolt hole 36. As discussed above, the actuating member 5 may be a lever, a handle, an arm, or actuated by any other suitable mechanism to raise and lift the foot 39 relative to the body 38. In the figure, the body 38 of the clamp 1' has been mounted over the top of the bedrail 12. When the actuating member 5 is in the shown position, the mouth of the clamp 1' is open and unclamped with respect to the bedrail 12. An operator may fixedly secure the clamp 1' onto the bedrail 12 with a single downward motion of the handle 6, in the direction of arrow 7, without the need to tighten any screws or latches. The upper and lower jaws 381 and 399 may wrap around the bedrail 12 and bite into the bedrail 12 to help secure the clamp 1' onto the bedrail 12. FIG. 6 is a side view of the clamp 1' in FIG. 5, wherein the clamp 1' is shown in an open position or unlocked position.

Figure 7:
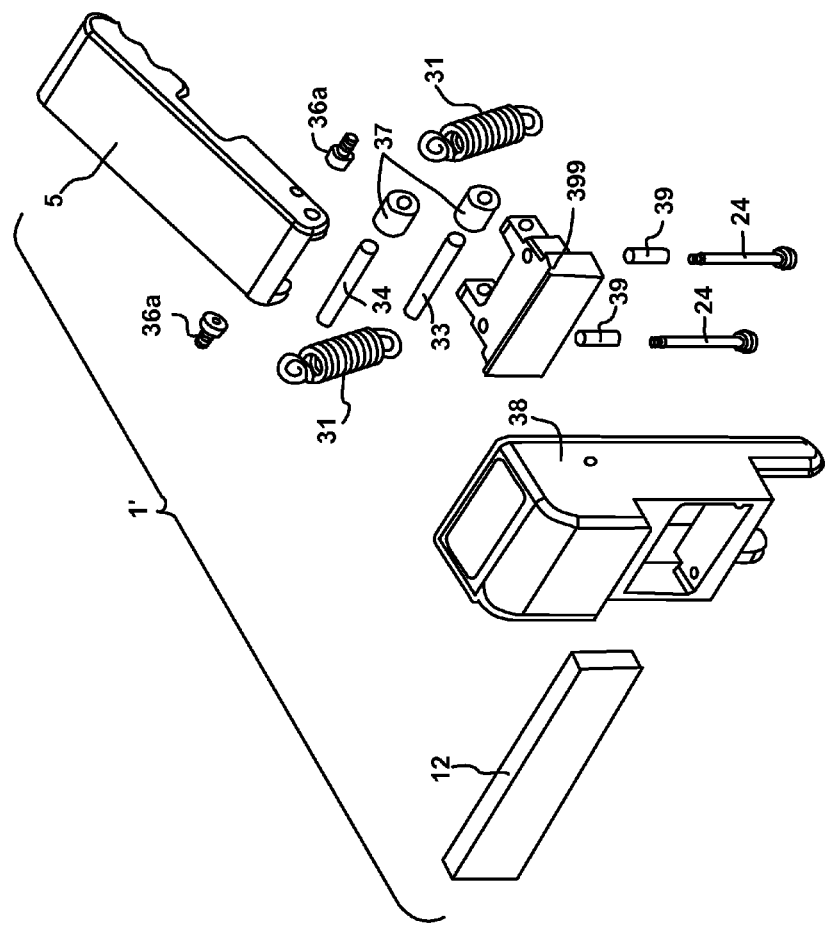
FIG. 7 is an exploded view of the clamp in FIG. 5.

FIG. 7 is an exploded view of the clamp 1' in FIG. 5, showing several of the components used in aspects of the present invention. In one aspect of the present invention, there are two biasing members 31, each being attached to an upper rod 34 coupled to the end of the actuating member 6 and a lower rod 33 coupled to the foot 39. Although in this aspect of the present invention, there are shown two biasing members 31, 31, one with skill in the art will appreciate that any number of biasing members may be used including one, two, three, four, five, six, seven, eight, nine, ten or more, depending on the resistance desired and the spring constant of the biasing members used. Furthermore, although springs/coils are illustrated in the exemplary aspect of the invention shown in FIG. 7, it should be appreciated by one of ordinary skill in the art that various types of suitable biasing members or selectively tensionable apparatuses may be used. For example, gas springs, metallic coil spring, flexible beams, or elastic members which may be used to draw the foot 39 up and hold the foot 39 in place, among others. Actuating member 5 may have a handle portion external to the body 38 and an elongated internal portion through which bolts 36a engage the body 38 to create a pivot point for the actuating member 6. Upper 34 and lower 33 bars provide rotational coupling of the biasing members 31 to the actuating member 5 and foot 39, respectively. The two biasing members 31 may be separated by cylindrical spacers 37 positioned over the upper 34 and lower 33 bars.

In some variations of the present invention, the foot 39 has a lower jaw 399. The lower jaw 399 may be made of a rigid material. In other variations, the internal surface of the lower jaw 399 may have any number of configurations, for example, tapered, curved or acute, beveled, and the like in order to accommodate different widths and shapes of bedrails 12. It should further be appreciated that the material of the lower jaw 399 may be any material that is compressible around the bedrail 12 and will provide sufficient stiffness so as to hold the clamp 1' in place without moving the clamp 1' or varying the angle of the medical instruments that may be attached to the clamp 1'. As illustrated in FIG. 4C and discussed above, lower jaw 399 may have various profiles which secure or fix the clamp 1' on bedrail 12.

When the actuating member 5 is moved downward to a closed position, the actuating member pivots about bolts 36, moving the upper rod 34 upwards. This movement tensions the biasing members 31, which then impart an upward force to lower rod 33 and hence the foot 39, which then slides upward along the guiding shaft 24. In this way, the foot 39 may slide along the shaft 24 in order to have an uninterrupted movement towards the bedrail 12. In other variations of the present invention, at least a portion of the actuating member 5, the biasing members 31, a portion of the foot 39, and the guiding shaft 24 are encased within the casing of the body 38.

Furthermore, it should be appreciated that the movement of feet 9 and 39 may be gradual or stepped so as to accommodate various sizes and shapes of rail 12. For example, the actuating member 5 may only need to be moved part of the way down to secure the clamp 1 or 1' onto the rail 12. Moreover, the movement of the actuating member 5 may be perpendicular relative to the rail 12, parallel relative to the rail 12, oblique relative to the rail 12, or may cross-over from one side of the clamp 1 (or 1') to the opposite side.

Figure 8:
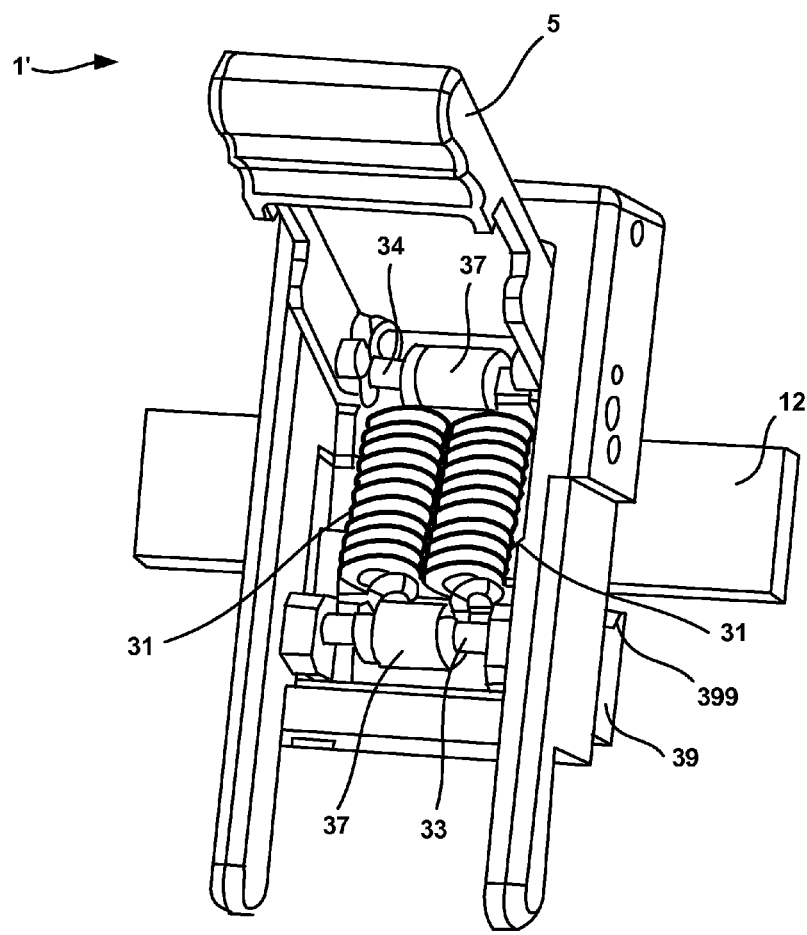
FIG. 8 is a rear view of the clamp in FIG. 5.
Figure 9:
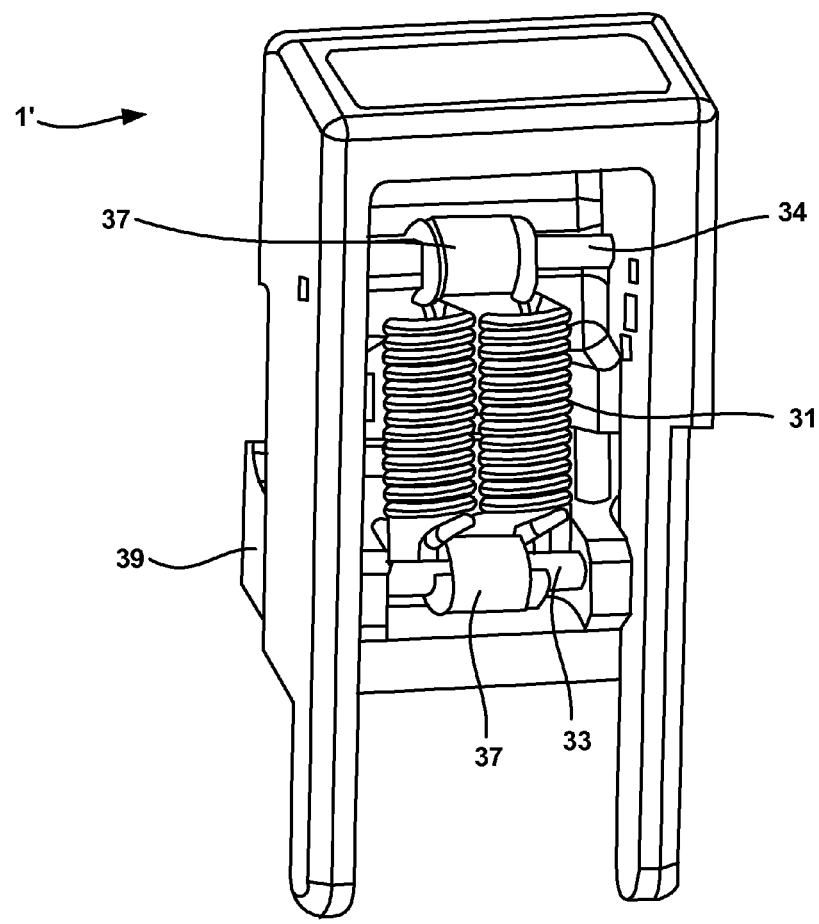
FIG. 9 is a rear view of the clamp in FIG. 5, wherein the actuating member has been removed to clearly show the biasing member.

FIG. 8 is a rear view of the clamp 1', wherein the clamp 1' is shown in an open or unlocked position and the biasing members 31 are exposed for clarity. FIG. 9 is another rear view of the clamp 1', wherein the actuating member 5 has been removed to expose the biasing members 31 for clarity.

Figure 10:
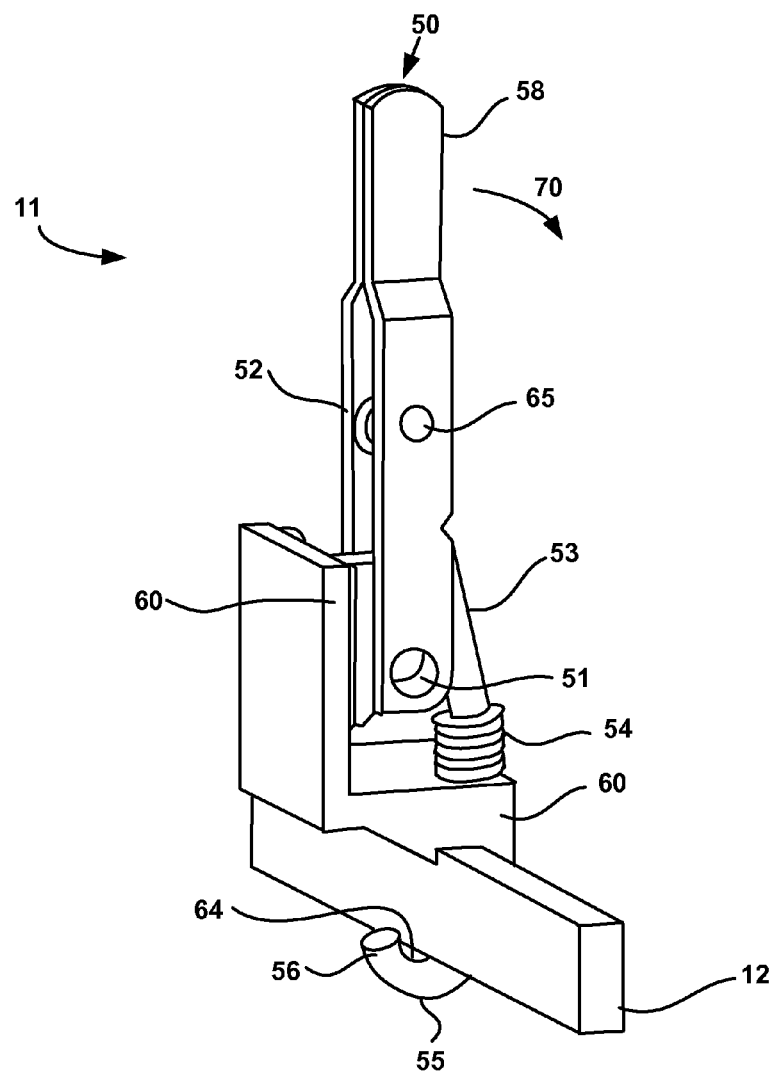
FIG. 10 is a perspective view of a clamp according to other aspects of the present invention.

FIG. 10 is a front perspective view of another aspect of the present invention. The bedrail clamp 1" is a latch-action toggle clamp which may include an actuating member 50, which may have a handle 58 that can be coupled to a body 60 via a bolt 51. Intermediate along the actuating member 50 is a rod 53 that is rotatably coupled to the actuating member 50 via a bolt 65 and cylinder 52. Further, the rod 53 is coupled to a biasing member 54, which is operationally connected to a foot 55. A mouth 64 is defined between the foot 55 and the body 60, wherein the mouth 64 is capable of receiving the bedrail 12. The actuating member 50 may be a lever, a handle, an arm, or actuated by any other suitable mechanism to raise and lift the foot 55 relative to the body 60. When the actuating member 50 is pivoted about bolt 51, the actuating member 50 transmits a linear force to the rod 53, which transmits a force to the biasing member 54 and foot 55. The biasing member 54 may be a spring, a coil, an elastic member, flexible beam, a gas charged spring, hydraulic, or any other mechanism that conveys or stores energy to lock the clamp 1" into place. For example, an upward movement of the actuating member 50 drives the foot 55 upward wherein the mouth 64 engages the bedrail 12. As in the aspects of the present invention described above, the foot 55 includes a lower jaw 56, which in this aspect of the present invention, results in the foot 55 taking the form of a hook shape. Moreover, the foot 55 may be configured to have any one of any number of suitable shapes, including but not limited to, an "L" shape or a "V" shape, wherein regardless of which shape is used, the surfaces of the foot 55 that contact or engage the bedrail 12 have a non-slip material coated or provided therein. The mouth 64 is sized so as to be able to accommodate a bedrail 12 therein. In the depiction of FIG. 10, the actuating member 50 has been moved up to the closed or locked position, which causes the rod 53 to pull the biasing member 54 into tension thereby drawing the foot 55 into secure or fixed engagement against the bottom of the bedrail 12.

Figure 11:
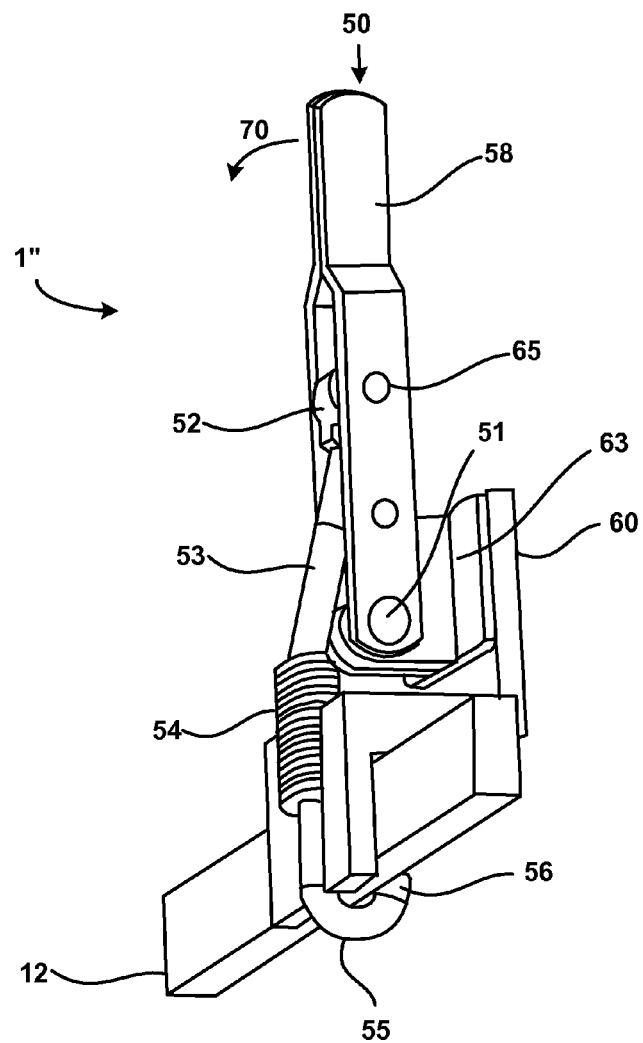
FIG. 11 is rear view of the clamp in FIG. 10.

FIG. 11 is a rear perspective view of the clamp 1". In this depiction, the actuating member 50 is in a closed position, with the handle 58 upright. Movement of the actuating member 50 in the downward direction indicated by arrow 70 will disengage the hook 55 from the bedrail 12.

Figure 12:
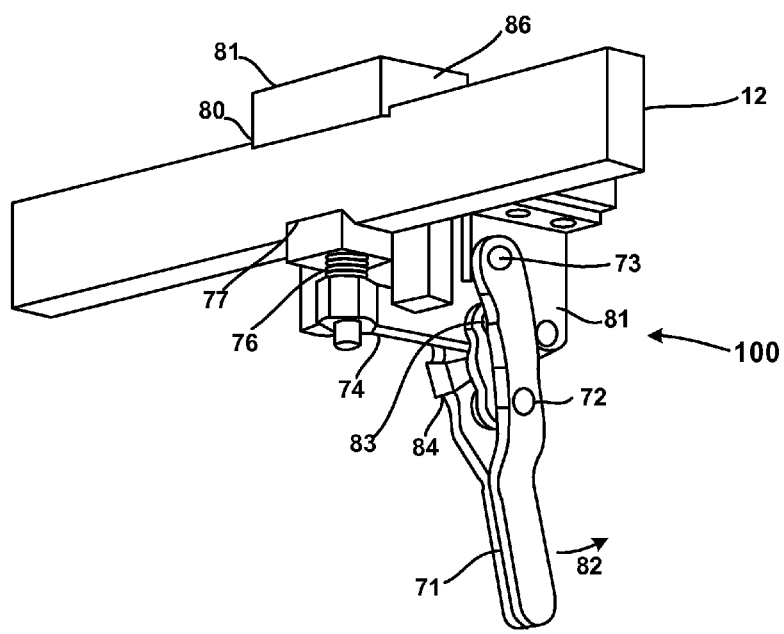
FIG. 12 is perspective view of a clamp according to other aspects of the present invention.

FIG. 12 is a perspective view of yet another quick-release bedrail clamp 100 which may use a toggle clamp 100, in accordance with another aspect of the present invention. The toggle clamp 100 includes an actuating member 71 which may have a handle 82. The clamp 100 is shown in a closed or locked configuration, and in this aspect of the present invention, the actuating member 71 is positioned below the location of the bedrail 12. This may be advantageous, for example, if it is desirable to leave the space above the bedrail 12 free of obstructions.

The actuating member 71 may be connected to the body 81 of the clamp 100 via a bolt 73. The actuating member 71 may be coupled to a foot 77 through a series of linked arms 84 and 74. The actuating member 71 may be a lever, a handle, an arm, or actuated by any other suitable mechanism to raise and lift the foot 77 relative to the body 81. A first end of the arm 84 is rotatably coupled to the actuating member 71 via bolt 72 and a second end of the arm 84 is rotatably coupled to a first end of the second arm 74 via bolt 83. The arm 74 may be movably coupled to the body 81. Thus, when the actuating member 71 is pivoted about the bolt 73, the actuating member 71 transmits a force to the arm 84, which in turn causes the arm 74 to pivot relative to the body 81. A second end of the arm 74 is coupled to a biasing member 76, which may be coupled to the foot 77. The biasing member 76 may be a compressible element, a flexible coil, flexible memory, or any other mechanism which may be compressed and conveys or stores energy to lock the clamp 100 into place. A mouth 86 is defined between the foot 77 and the body 81, wherein the mouth 86 is capable of receiving the bedrail 12 therein. When the actuating member 71 is moved down, the arm 74 pivots up, thereby driving the foot 77 against a bottom of the bedrail 12 and the mouth 86 to close around the bedrail 12. The foot 77 is held against the bedrail 12 by the compressive force of the biasing member 76 (in contrast to the tension force described in the above variations of the present invention). The range of foot 77 positions where the biasing member 76 may be held in compression provides for engagement of bedrails 12 having varying heights. As discussed above, and illustrated in FIG. 4C, the foot 77 and an upper jaw 80 may have various profiles which engage the bedrail 12 to secure or fix the clamp 100 onto the bedrail 12. When the actuating member 71 is moved in the upward direction indicated by arrow 82, the clamp is moved into an open position.

As described in the above aspects of the present invention, the bedrail 12 may be secured by a lower jaw in the foot 77 as well as an upper jaw 80 in the top part 79 of the body 81.

Figure 13:
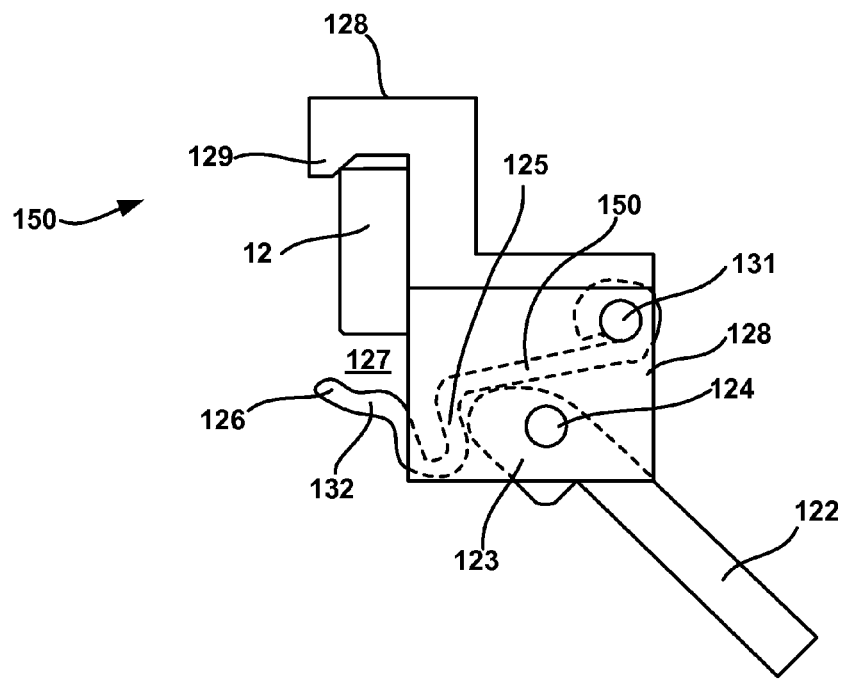
FIG. 13 is cross-sectional view of a clamp according to other aspects of the present invention.

FIG. 13 depicts a side view of yet another aspect of the present invention of a quick-release bedrail clamp 150. In the depicted view, the clamp 150 is in an open or unlocked position. In this variation of the present invention, an actuating member 122 is coupled to a body 128 at pivot point 124. The upper part of the body 128 has an upper jaw 129 which may be tapered, and a mouth 127 adapted for receiving a bedrail 12. Moreover, as discussed above and illustrated in FIG. 4C, the upper jaw 129 may have various profiles adapted to receive a bedrail 12 therein. The actuating member 122 may comprise a cam mechanism 123 positioned around the pivot point 124. The cam mechanism 123 contacts an arm 150, which may be movably coupled to the body 128 at pivot point 131. The arm 150 may be integral with a U-shaped biasing member 125, which in turn may also be integral with a foot 132. The foot 132 may include an angled lower jaw 126 to engage a variety of bedrail 12 shapes and sizes. The actuating member 122 may be a lever, a handle, an arm, or actuated by any other suitable mechanism to raise and lift the foot 132 relative to the body 128.

Figure 14:
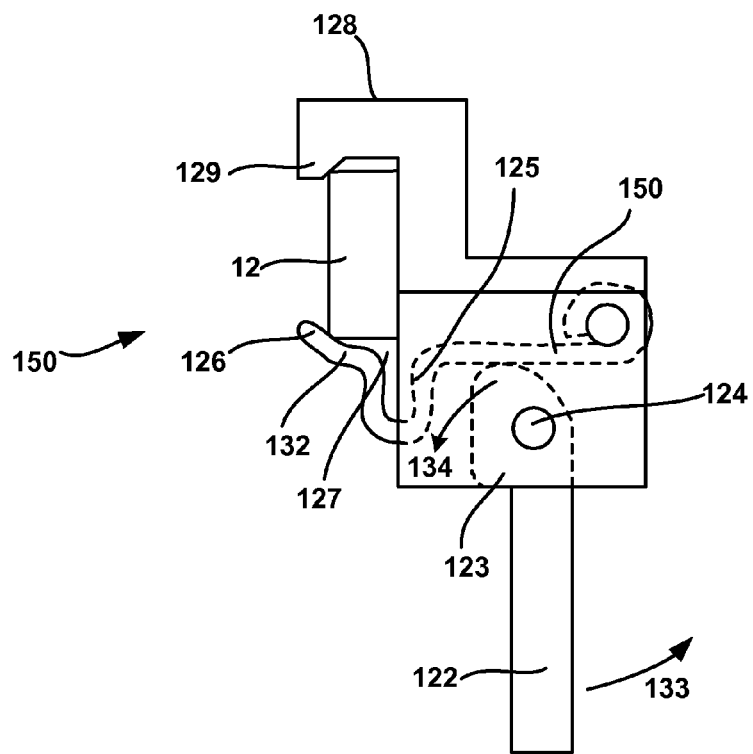
FIG. 14 is a side view of the clamp in FIG. 14, wherein the clamp is shown in a closed position.

FIG. 14 is another side view of the present invention illustrated of FIG. 14, wherein the clamp 150 is in a closed or locked position. When the actuating member 122 is pivoted down, the cam mechanism 123 pushes against the arm 150 causing the arm 150 to pivot and drive the foot 132 toward the bottom of the bedrail 12. Once the bottom of the bedrail 12 is engaged, the biasing member 125 is flexed, thereby forcing the foot 132 into fixed engagement with the bedrail 12. Movement of the actuating member 122 in the upward direction 133 causes the head of the cam 123 to move in direction 134 such that the biasing member 125 is in a relaxed position or non-tensioned and the foot 132 disengages from the bedrail 12.

Figure 15:
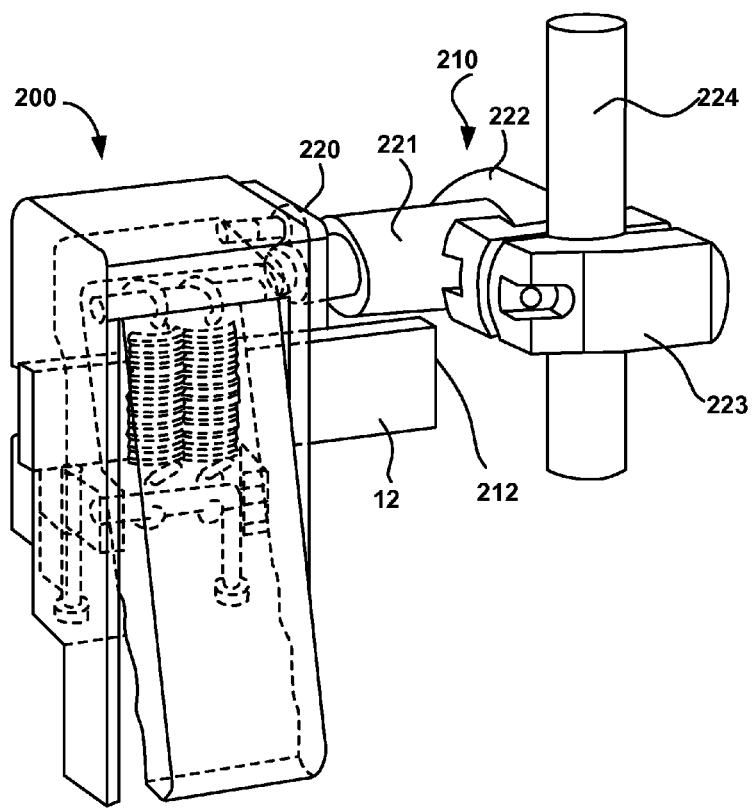
FIG. 15 is a perspective view of a clamp according to other aspects of the present invention.

FIG. 15 illustrates another aspect of the present invention of a bedrail clamp 200 further having a 2-axis rod clamp. The bedrail clamp 200 may be connected to the two-axis rod clamp 210 by a mounting plate 220. The rod clamp 210 includes a cylinder arm 221 which is coupled to the mounting plate 220 via a first rotatable joint 212. A second rotatable joint 222 is coupled at the other end of the cylinder arm 221, which is connected to a rod clamp 223. The clamp 223 is used to secure a rod 224 that is part of a medical accessory. It should be appreciated that the medical accessories attached to the 2-axis rod clamp 200 may include instrument trays, surgical devices, IV bags, retractors, arm and leg boards, and the like. The rotatable joints allow the rod 224 to be rotated along axes perpendicular and parallel to the bedrail 12. Moreover, being able to attach numerous medical instruments and devices to the 2-axis rod clamp is particularly beneficial when transporting patients to different locations within or outside of the hospital.

Figure 16:
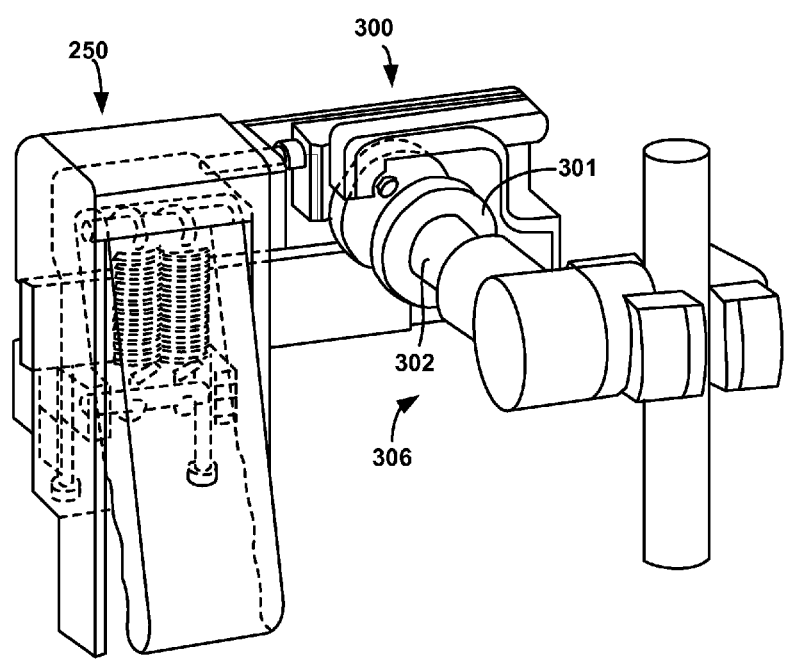
FIG. 16 is a perspective view of a clamp according to yet more aspects of the present invention.

FIG. 16 shows another aspect of the present invention of a bedrail clamp 250 that may include additional medical instrument attachment features. The clamp 250 may have a toggle clamp 300 extending horizontally therefrom. In the depicted aspect of the present invention, the toggle clamp 250 may hold a 2-axis rod clamp 306 such as described above with respect to FIG. 15; however, it will be appreciated that any number of devices may be held by the toggle clamp 300. The 2-axis rod clamp 306 may be coupled to the toggle clamp 300 through a spline shaft 302 and spline bushing lock 301 to provide incremental control over the rotation of the spline shaft 302. Such spline shaft 302 and bushing lock 301 features may also be included in the other rotatable joints depicted in FIGS. 15 and 16.

Those of skill in the art will appreciate that many other coupling mechanisms may be used for attaching a medical instrument to the bedrail clamps described herein in such a manner as to permit the medical instruments to be moved relative to the bedrail.

One variation of the present invention may include the use hydraulic members with air or fluid in the piston as biasing members.

Other variations of the present invention include methods of attaching medical instruments to bedrails, such as on hospital or operating room beds, using the clamps described herein. Such variations of the present invention may include first detachably mounting the clamp onto the bedrail. For example, many of the clamps described above include a clamp body having a recess and a rigid jaw. The bedrail may be placed within the recess and the clamp body may be rested on the bedrail with the jaw partially wrapping around the back of the bedrail. In this manner, the bedrail clamp may rest on the bedrail without falling off while the clamp has not yet been locked in place. Next, the user may close the clamp by moving an actuating member on the clamp (upward, downward or rotating depending on the clamp design). The movement of the actuating member may cause a foot to slide toward and contact the bedrail causing tensioning or compression of a biasing member, thereby forcing the foot to bite into the bedrail and locking the clamp in place around the bedrail.

In some aspects of the present invention, a user first attaches instrument clamps, optionally containing pivot or other movement mechanisms, to the bedrail clamp. Various medical instruments may then be held by these auxiliary clamps. In some aspects of the present invention, medical instruments may be attached to the bedrail clamp prior to its attachment to the bedrail.

Embodiments of the invention include surgical devices and components coupled with surgical devices. It is appreciated that the surgical devices and other components described in conjunction with the present invention may be electrically, mechanically, hydraulically, directly, indirectly and remotely coupled. It is appreciated that there may be one or more intermediary components for coupling components that may or may not be described.

For example, telemanipulation and like terms such as "robotic" refer to manipulating a master device and translating movement or force applied at the master device into commands that are processed and transmitted to a slave device that receives the commands and attempts to generate the intended movements at the slave device. It is appreciated that when using a telemanipulation device or environment, the master and slave devices can be in different locations.

Embodiments of the present invention are well suited to be used with both telemanipulation systems direct manipulation systems.

In one embodiment, embodiments of the present invention described above may further comprise an end effector coupled to the output end of the plurality of couplings, wherein the end effector moves in response to receiving at least the portion of the input force transmitted by the plurality of couplings. Optionally, the end effector comprises a surgical tool. It is appreciated that the input force may be generated by a direct manipulation device or may be generated by a telemanipulation device.

In yet another aspect, the present invention may further comprise a manually-driven hydraulic drive system having an input mechanism coupled to the input end of the plurality of couplings, wherein the drive system generates the input force, and an end effector coupled to the output end of the plurality of couplings, wherein the end effector comprises a surgical tool and moves in response to receiving at least the portion of the input force transmitted by the plurality of couplings. It is appreciated that the input force may be generated by a direct manipulation device or may be generated by a telemanipulation device.

The present invention relates to flexible wrist-type elements capable of transmitting axial and/or rotational force around corners and bends. For illustrative purposes, these aspects are discussed herein with respect to a surgical application, however, it should be understood that these aspect may equally apply to many other applications, such as robotics, manufacturing, remote controlled operations, etc., and any application where the transmission of axial and/or rotational force around corners and bends is desired.

Aspects of the present invention include features relating to a bedrail clamp for surgical-related activities and methods of manufacture and use thereof, including variations for use with an angularly moveable hub housing and a rotatable and operable end effector driven via additional drive train elements that include one or more flexible couplings, such as universal-type joints. Force transmitted via the set of such elements includes, for example, lineal force and rotational force. It is appreciated that the force transmitted may be generated locally or remotely to the output device and it should be appreciated that embodiments of the present invention are well suited to be used in both direct manipulation and telemanipulation environments.

Some portions of the system may be electrically conductive, such as for use in electrosurgery applications. For example the outer housing of the device may be non-conductive, so as to insulate inner conductive portions. The motion transmitting inner portions may be conductive so as to allow electrosurgical current to be delivered to the end effector and/or any tools used therewith, while the outer housing thereby insulates the device. In addition to certain components being conductive, conducting lubricants may also be used to ensure or enhance electrical communication. In some variations, the electrical energy communicated may be of high frequency to enhance communication of the energy across abutting surfaces and lubricants. It is appreciated that in one embodiment, the electrical communication may be generated from a telemanipulation system.

A "manipulator" as used herein refers to a device that at its proximal end comprises a set of controls to be used by an operator and at its distal end comprises means for holding and operating a tool, referred to herein as the "tool receiving device." The controls allow the operator to move the tool receiving device within the generally closed or confined area, and operate the tool as intended. The tool receiving device is adapted to receive tools interchangeably and can cause a variety of different tools to operate in their intended purpose. Examples of a manipulator include any of a variety of laparoscopic or arthroscopic surgical tools available on the market for use by surgeons, or the device described in U.S. Pat. No. 6,607,475. The tool receiving device of a manipulator is adapted to enter a generally closed or confined area through a small opening, such as a small hole in a mechanical device or a small incision in a human body. It is appreciated that the proximal end may be remote to the distal end and can be used in a telemanipulation environment.

As used herein, "proximal" refers to the part of the device that remains outside of the closed area, closest to the operator. "Distal" refers to the end inserted into the closed area, farthest away from the operator. The proximal and distal ends are preferably in communication with each other, such as fluid communication, electrical communication, communication by cables, telemanipulation and the like. Such communication can occur, for example, through a catheter or cannula, which houses the lines used for such communication. The catheter or cannula is preferably a tube or other substantially cylindrical hollow object. In some embodiments, the catheter or cannula does not house any lines for communication between the proximal and distal ends. In these embodiments, the catheter or cannula is used for placing an object, located substantially at the distal end of the catheter or cannula, inside the closed area for further manipulation. It is appreciated that the distal and proximal ends may be in communication with the use of a telemanipulation system.

During the operation of the devices described herein, the catheter or cannula (hereinafter referred to simply as "cannula") is inserted into a generally closed or confined area where the tools are to be used such that its proximal end remains outside the closed area while the distal end remains inside the closed area. In the context of surgical procedures, the cannula is inserted into the patient's body such that its proximal end remains outside the body while the distal end remains inside the body. In one embodiment, the proximal end is remote to the patient. This allows the operator, e.g. a surgeon, to access the interior of the closed area, e.g., a patient's body, using the cannula, thereby eliminating the need for "open" surgical procedures both locally and remotely. Only a small incision is needed to insert the cannula, and the various surgical instruments are inserted, and the procedures performed, through the cannula. The proximal end may be remote to the patient and force applied at the proximal end may be translated using a telemanipulation system that recreates the input force at the distal end.

The instruments or tools described herein are capable of being attached to the distal end of the manipulator in a number of different ways. For instance, in some embodiments the tools are attached magnetically, while in other embodiments the tools may clip on to the distal end of the manipulator. In one embodiment, a telemanipulation system may be used to couple the distal and proximal ends. Additional details on the attachment of the tools is provided below.

The manipulator, which is used to position and maneuver the tools within the confined space, can be a hydraulic, pneumatic, robotic, direct manipulation, telemanipulation, standard surgical, minimal invasive surgery (MIS), electrical, or mechanical device, or a device comprising a combination of any of these systems. Any system that can be used to position and manipulate the tools is contemplated.

Although the invention has been described with reference to various aspects of the present invention and examples, it should be understood that numerous and various modifications may be made without departing from the spirit of the invention.

What is claimed is:

1. A clamping device that is mountable onto a bedrail, the clamping
   device comprising:
   a body having a first jaw;
   a shaft connected to the body;
   a foot having a second jaw slideably coupled with the shaft;
   the first and second jaws forming a linearly adjustable mouth;
   a biasing member having a first end rotatably coupled to the foot at a first joint and a second end rotatably coupled to an actuating member; wherein the actuating member being configured to transmit input force to the mouth through the biasing member wherein the biasing member automatically adjusts a distance between said foot and said mouth to closely match dimensions of said bedrail by linearly sliding the foot along the shaft, wherein a protrusion extends from the body and towards the foot, the protrusion defining an outer boundary of the mouth, and wherein the protrusion engages the bedrail and fixes the clamp onto the bedrail by securing the rail between the protrusion and the mouth.

2. The clamping device according to claim 1, wherein the first jaw opposes the second jaw.

3. The clamping device according to claim 1, wherein the protrusion is a first protrusion extending from the first jaw and the second jaw includes a second protrusion, the first and second protrusions extend toward each other.

4. The clamping device according to claim 3, wherein the first protrusion includes a first planar surface opposing a first planar surface of the second protrusion, and wherein at least one of the first and second protrusions includes a second surface extending oblique relative to the first planar surface.

5. The clamping device according to claim 4, wherein the second surface is one of flat, jagged, sinusoidal curve, rectangular wave, or toothed.

6. The clamping device according to claim 4, wherein the second surface directly engages an outer surface of the rail when the actuating member is moved in a first direction.

7. The clamping device according to claim 6, wherein the first direction is one of orthogonal relative to the bedrail, and parallel relative to the bedrail.

8. The clamping device according to claim 4, wherein the second surface includes a non-slip material provided thereon.

9. The clamping device according to claim 1, wherein the mouth defines one of a J shape or C shape opening.

10. The clamping device according to claim 1, wherein the biasing member is one of a spring, a coil, an elastic member, a flexible beam, and a gas charged spring.

11. The clamping device according to claim 1, further comprising a rod coupling the actuating member to the biasing member, and wherein the actuating member is also coupled to the body.

12. The clamping device according to claim 11, wherein the foot has one of a C-shape, J-shape, L-shape and V-shape.

13. The clamping device according to claim 12, wherein an outer surface of the foot that engages the bedrail includes a non-slip material provided thereon.

14. The clamping device according to claim 1, wherein the actuating member is one of a lever, a handle or an arm.

15. The clamping device according to claim 1, wherein the actuating member is configured to rotate the biasing member when actuated.

16. The clamping device according to claim 1, wherein the fixed end of the actuating member contacts the biasing member.

17. The clamping device according to claim 1, wherein the actuating member further comprises a free end opposing the fixed end.

* * * * *